United States ▇▇▇

Munger

[11] 3,713,329
[51] Jan. 30, 1973

[54] ULTRASONIC ECHO ENCEPHALOGRAPH FOR MEASURING THE POSITION OF THE MIDLINE

[75] Inventor: Donald W. Munger, New Milford, Conn.

[73] Assignee: Automation Industries, Inc., El Sequndo, Calif.

[22] Filed: Jan. 4, 1966

[21] Appl. No.: 518,575

Related U.S. Application Data

[63] Continuation-in-part of Ser. No. 440,231, March 16, 1965, abandoned.

[52] U.S. Cl.................................73/67.9, 128/2 V
[51] Int. Cl.............................................G01n 29/04
[58] Field of Search.............................73/67.5–67.9; 128/2 V

[56] References Cited

UNITED STATES PATENTS

| | | | |
|---|---|---|---|
| 2,871,404 | 1/1959 | Mugele | 73/67.7 X |
| 3,050,988 | 8/1962 | Gordon et al. | 73/67.5 |
| 3,323,512 | 6/1967 | Clynes | 73/67.7 X |

OTHER PUBLICATIONS

Gordon, D.; Echo-Encephalography, British Medical Journal June 13, 1959, p. 1500-1504.

Lithander, B.; A Control Method For Echo-Encephalography; Acta Psychiat. Scandinavica, Vol. 35, p. 235-240, 1960.
Robinson, D. E. et al., The C.A.L Two Channel Ultrasonic Neuroscope, Commonwealth Acoustic Laboratories Report No. 23, March 1964, Commonwealth of Australia Department of Health.

Primary Examiner—Richard C. Queisser
Assistant Examiner—John P. Beauchamp, Jr.
Attorney—Dan R. Sadler

[57] ABSTRACT

An ultrasonic instrument is disclosed herein which is particularly adapted for locating the midline structure of a brain relative to the geometric center line of a head. The instrument includes means for automatically producing a first indication representing the geometric center line of the head and a pair of indications representing the distances between the midline structure and the two opposite sides of the head. These three indications are all juxtaposed whereby they may be directly compared with each other to positively identify the position of the midline structure and its location relative to the geometric centerline of the head.

1 Claim, 6 Drawing Figures

ULTRASONIC ECHO ENCEPHALOGRAPH FOR MEASURING THE POSITION OF THE MIDLINE

This application is a continuation in-part of copending application Ser. No. 440,231 filed Mar. 16, 1965 now abandoned in the name of Donald W. Munger and assigned of record to Automation Industries, Inc.

At the present time there are a wide variety of ultrasonic testers or instruments that are capable of inspecting objects and measuring various characteristics thereof including its dimensions and the presence and/or location of internal structures like hidden defects. These testers or instruments may be divided into two types i.e. through transmission and pulse-echo.

In the so-called through transmission type of ultrasonic tester a transducer is positioned on one side of the object to transmit ultrasonic energy into and through the object. A second transducer is positioned on the opposite side of the object to receive the ultrasonic energy after it has passed completely through the object. The transducers are coupled to circuitry for determining the amount of time delay, the amount of attenuation and/or the complete loss of the signal resulting from the energy passing through the object. This circuitry is in turn connected to a suitable "readout mechanism" for indicating the characteristics of the object. By way of example, the "readout mechanism" may include a cathode ray tube that creates a visual display corresponding to the signals.

In the so-called pulse-echo type of ultrasonic tester, one or more transducers are coupled to the object or workpiece being investigated. The transducer intermittently transmits pulses of ultrasonic energy into the object or workpiece and then "listens" for echoes reflected from the various portions thereof including any internal defects. During the listening interval the transducer is coupled to circuitry that is responsive to the length of the time delay required to receive the reflected echoes. This circuitry is in turn connected to a suitable "readout mechanism" such as a cathode ray tube or oscilloscope. By observing the display the operator can determine the thickness of the workpiece and/or detect the presence of internal defects and the distance to the defect.

The foregoing types of ultrasonic testers are effective in measuring some of the various characteristics of a workpiece or object. However, under some circumstances it has been found extremely difficult, if not impossible, to determine certain other types of characteristics. For example, under some circumstances it is desirable for the workpiece to have an internal structure which is disposed in a predetermined arrangement. More particularly, the internal tissue structures of the human head, i.e. the brain, are divided into a plurality of different regions which are normally substantially symmetrically disposed within the skull. Certain of the centrally located tissue form an interface from which ultrasonic energy will be reflected. Since this interface is normally disposed substantially along the center line of the skull, it is commonly referred to as the "midline" and the ultrasonic reflections are referred to as the "midline echoes." As will become apparent subsequently, the "midline" is a complex structure and as a result produces complex echoes.

Some abnormalities such as a concussion, tumor, subdural hematoma, etc. produce asymmetric pressures within the skull. This, in turn, will cause a sufficient shifting of one or more portions of the brain structure to laterally displace the midline from the center of the skull. Accordingly, measuring the displacement of the midline from the center of the skull is a very useful diagnostic tool in predicting the presence of various abnormalities such as concussions, tumors, subdural hematomas, etc.

Heretofore, in order to sense the displacement of the midline by the use of ultrasonic energy it has been customary to use a pulse-echo form of tester of the type described above. When employing such a tester it has been necessary to first ultrasonically measure the distance from one side of the head to the midline. Next, as a separate operation, the distance from the opposite side of the head to the midline was measured. The results of these two measurements were then compared with each other so as to determine the amount of difference, if any, between these dimensions.

Since the absolute distances to the midline are normally immaterial, the making of such measurements are of little direct value. In addition, the making of the two separate measurements and the manual comparison thereof is not laborious and time consuming, but is a significant source of possible error. It will thus be seen that such a method is not particularly well suited for use during an emergency situation.

It should also be noted that the brain is a very complex structure and possesses many areas besides the "midline" that are capable of reflecting ultrasonic energy. It has been possible to employ ultrasonic instruments for measuring the characteristics of various regions of the brain and/or adjacent structures. However, it has also been possible heretofore, to be observing an echo from a tissue structure other than the midline when, in fact, it was believed that the position of the midline was being measured. As a consequence, heretofore there has been no assurance that the measurements being compared were both from the midline. This, in turn, has tended to reduce the reliability of the measurements obtained heretofore.

It will thus be seen that although prior ultrasonic apparatus have been very useful in measuring various characteristics of workpieces or objects and have been capable of determining the position of a cranial midline, they have, however, been subject to numerous limitations and objections.

The present invention provides an ultrasonic tester which overcomes the foregoing difficulties and limitations. More particularly, the present invention provides an ultrasonic tester which is capable of ultrasonically inspecting the arrangement of the internal portions of a workpiece or object, and particularly the relative positions of the portions without a manual comparison of the various physical dimensions. The present embodiment of the tester particularly adapted to sense the position of the midline tissue structure within a human head and indicate directly and unambiguously whether the midline structure is in a true mid-position or has been shifted from the mid-position. In addition, the ultrasonic tester is particularly adapted to sense and indicate the presence and location of such abnormalities as tumors, subdural hematoma, etc.

In the embodiment of the tester disclosed herein, a pair of transducers are adapted to be simultaneously disposed on the opposite sides of a head in substantial alignment with each other. Means are provided for automatically operating these transducers in a plurality of different modes. In one mode, the first transducer transmits at least one pulse of ultrasonic energy completely through the head to the second transducer on the opposite side of the head. In a second mode, one of the transducers transmits at least one pulse into the head and then receives the echoes resulting from the pulse being reflected from the various structures such as the midline. In a third mode, the remaining transducer transmits at least one pulse of energy into the head from the other side and receives the echoes from the midline and other structures. The resultant signals are coupled through suitable circuit to output or display means such as a cathode ray oscilloscope where they are displayed in substantial alignment with each other. The flight time of the energy traveling completely through the head will be substantially identical to the flight time of the energy reflected from the center. As a consequence, if the midline is truly in the center of the head, the display for the through transmission and the displays corresponding to the reflections from the midline structure will be substantially aligned or symmetrically disposed with respect to each other thereby indicating a perfectly centered midline.

In the event that the midline structure is shifted from a truly center position the displays representing the echoes from the two sides will be displaced in opposite directions by equal amounts thereby unambiguously indicating a midline shift. If both of the echoes are not being reflected from the midline, the echo displays will not be symmetrically positioned with respect to the display for the through transmission. This, in turn, will provide an unambiguous indication that the midline is not being sensed.

In addition an automatic gain control is provided for sensing the amplitude of one or more of the signals. The gain of the system is then modified to compensate for any variations in the amplitude of the echoes whereby a substantially uniform and unambiguous display is provided.

It may thus be seen that an operator may merely observe the relationships of the various displays to detect any displacement of the midline and it is no longer necessary to make a plurality of measurements to determine the absolute position of the midline or to compare such measurements. In addition to visually observing the displays at the time the measurements are being made, the operator may cause a photograph to be made of the display to provide a permanent record.

These and other features and advantages of the present invention will become readily apparent from the following detailed description of one embodiment thereof, particularly when taken in connection with the accompanying drawings wherein like reference numerals refer to like parts and wherein:

Referring to the drawings in more detail, and particularly FIG. 1 to 4, the present invention is particularly adapted to be embodied in an ultrasonic tester 10 for inspecting the internal structure of a workpiece. Although this tester 10 may be used for inspecting a wide variety of different types of workpieces, in the present instance it is particularly adapted to inspect a human head 12, and particularly for indicating the symmentry of the position of the tissue structure forming the midline 14 in such a head 12.

Figure 1:
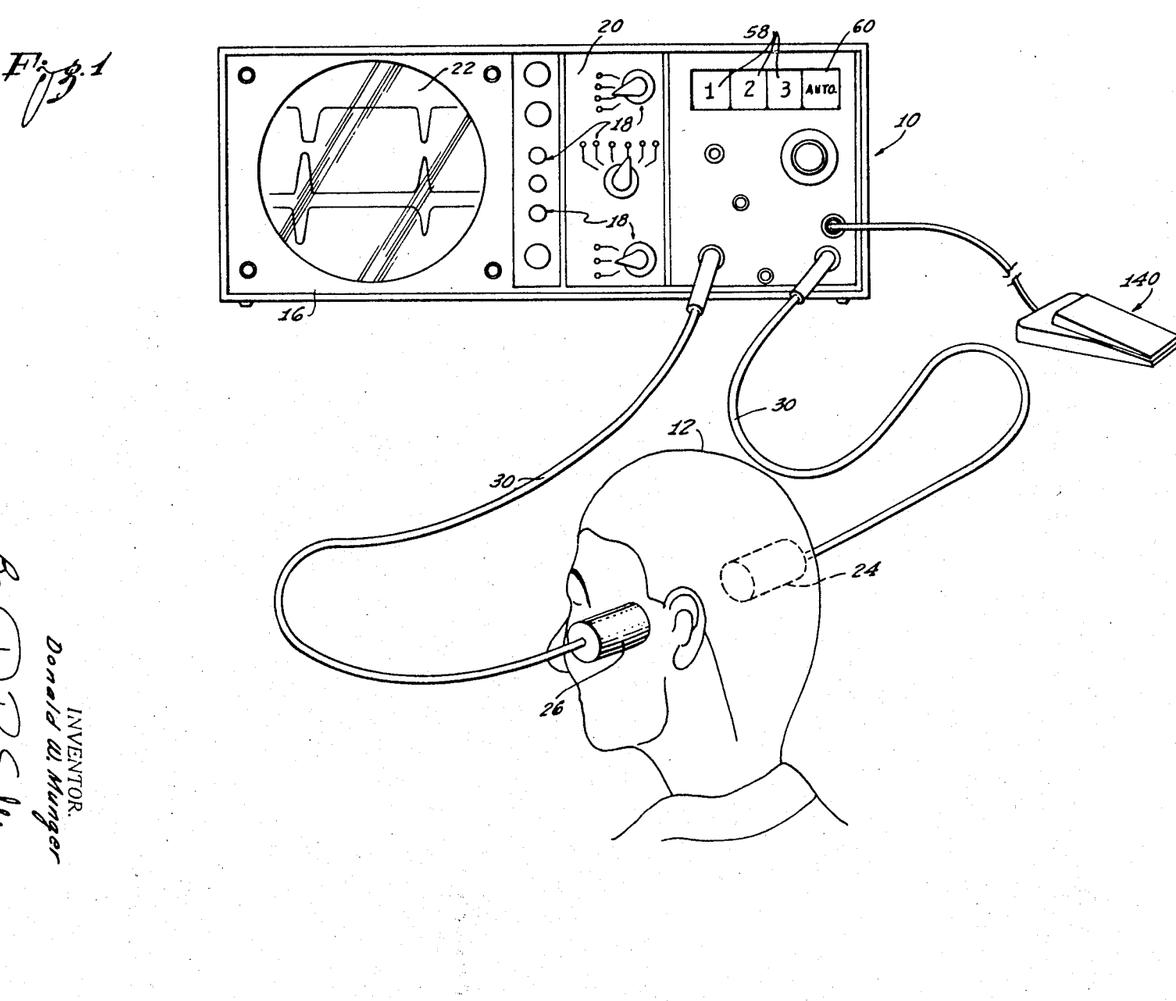
FIG. 1 is a perspective view of an ultrasonic tester particularly adapted for use in measuring lateral displacement of a cranial midline.

As may best be seen in FIG. 1, the ultrasonic tester 10 is embodied in a case 16 having a front panel 20. The various electronic circuits which are included in the tester 10 are contained inside of this case 16. A plurality of controls 18 are mounted on the front panel 20 to permit manually adjusting the various circuits or otherwise controlling the tester 10. Suitable readout means are provided so as to visually indicate and/or record the nature of the signals. In the present instance the display means includes a conventional cathode ray oscilloscope tube 22. The display face of the tube 22 may be positioned in the front panel 20 so that it can be readily observed by the operator. In addition, a camera may be positioned to photograph the face of the tube 22 and thereby provide a permanent record of the oscillogram.

A pair of ultrasonic probes or transducers 24 and 26 are provided for being acoustically coupled to the opposite sides of the workpiece, i.e. a patient's head 12 in the present instance. The probes or transducers 24 and 26 are coupled to the tester 10 by one or more electrical conductors such as a pair of coaxial cables 30. The probes 24 and 26 may be of a conventional variety and include a device such as a piezoelectric crystal. Such a crystal will radiate ultrasonic energy when it is excited by an electrical signal of ultrasonic frequency. Conversely, When the crystal is mechanically excited by ultrasonic energy it will produce a corresponding electrical signal. In the present instance the probes or transducers 24 and 26 are shown as two separate and individual units. However, if desired the transducers may be combined into a probe structure for retaining them properly positioned on the opposite sides of the head.

Figures 2, 4:
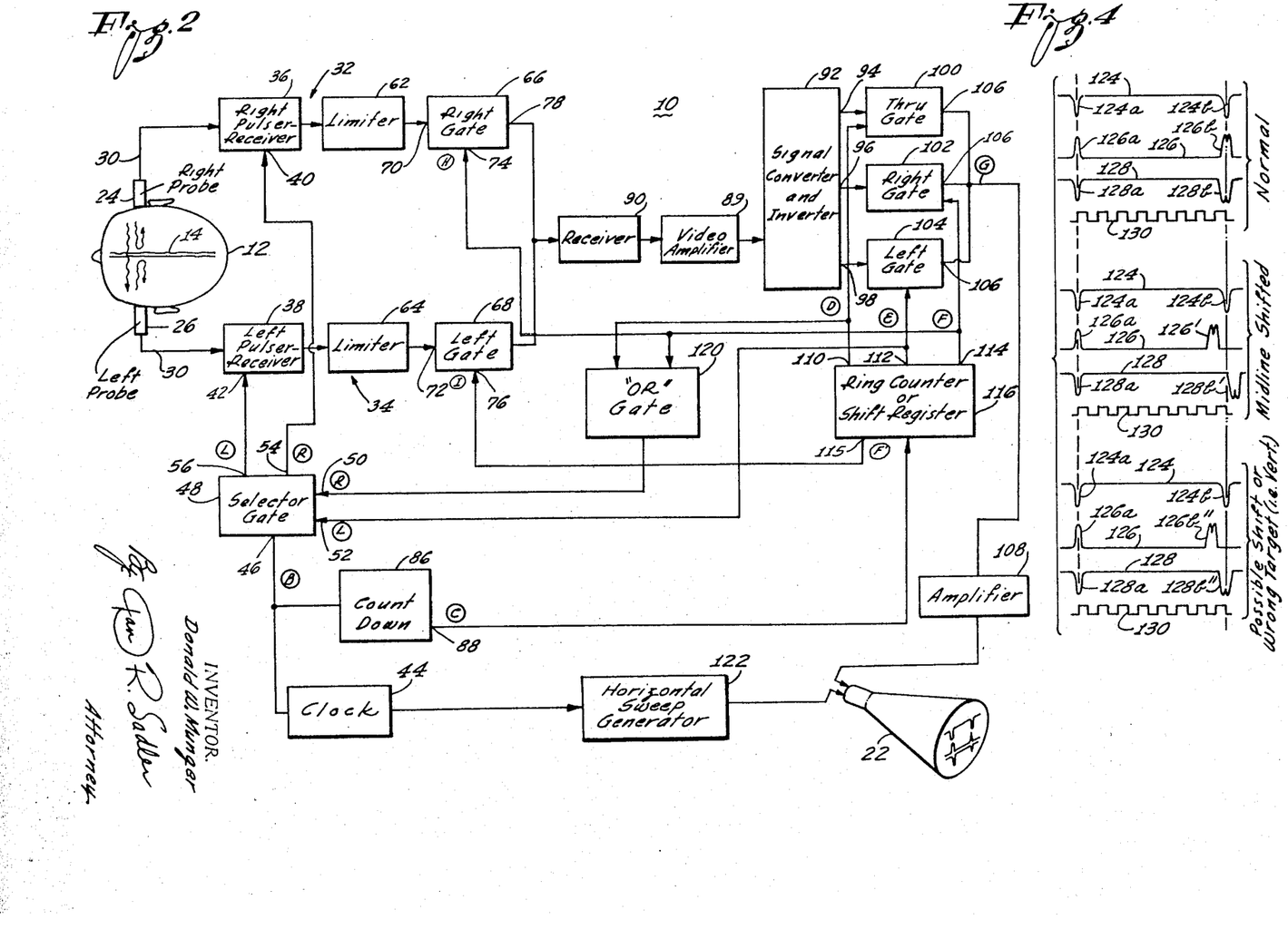
FIG. 2 is a block diagram of the electrical circuitry in the ultrasonic tester shown in FIG. 1.
FIG. 4 is a plurality of typical oscillograms produced on the ultrasonic tester of FIG. 1.

As best seen in FIG. 2, the coaxial cables 30 separately couple the probes or transducers 24 and 26 with separate channels 32 and 34 in the tester 10. The input to each channel 32 and 34 include a pulser-receiver 36 and 38. These pulser-receivers 36 and 38, which may be of a conventional variety, are effective to supply electrical signals to the transducers 24 and 26 each time a trigger signal is present on the input 40 and 42. Each time the pulser-receiver energizes a transducer, the transducer will mechanically vibrate and radiate a short burst of ultrasonic energy. Normally, this burst of energy will be on the order of a few microseconds long or less, and in a frequency of about 0.2 megacycles to about 25 megacycles.

When there are no signals on the control inputs 40 or 42 the pulser-receivers 36 or 38 maintain the transducers in a standby or "listen" condition. When ultrasonic energy is incident on the transducer during this interval a corresponding electrical signal will be produced and fed to the pulser-receiver 36 or 38.

In order to control the operation of the pulser-receivers 36 and 38, as well as to control and synchronize the rest of the tester 10, a clock generator 44 is provided. This generator 44 may be of the free running variety capable of producing suitable timing or clock pulses, having a substantially constant frequency. By way of example, the clock 44 may be a multi-vibrator having a frequency on the order of about 1 kilocycle. The clock pulses are normally in the form of square waves similar to those shown in line B of FIG. 3.

The output from the clock 44 is connected to one of the control inputs 46 to a selector gate 48. This gate 48 also includes right and left control inputs 50 and 52, and right and left signal outputs 54 and 56. The right and left outputs 54 and 56 are coupled directly to the control inputs 40 and 42 on the pulser-receivers 36 and 38. The gate 48 may be of conventional design. When a gating signal is applied to the right control input 50, the clock pulses will pass directly through the gate 48 to the right output 54 and from there to the right pulser-receiver 36. Thus, a signal on the right control input 50 will cause the right transducer 24 to radiate bursts of ultrasonic energy in synchronism with the clock pulses. Under these circumstances, no energy will be radiated from the left transducer 26.

When a gating signal is present on the left control input 52, the right transducer 24 will not transmit. However, the clock pulses will now pass through the gate 48 to the left output 56 and to the control input 42 on the left pulser-receiver 38. Thus, signal on the left control input 52 will cause the left transducer 26 to transmit ultrasonic energy. It may be seen that the selector gate 48 may be of a substantially conventional design such as a mutually exclusive OR gate wherein the clock pulses will be present on either the right output 54 or the left output 56, but never simultaneously on both outputs.

When the clock pulses pass through the gate 48 to the control inputs 40 or 42 each of the clock pulses will momentarily energize the pulser 36 or 38 and cause a short burst of ultrasonic energy to be transmitted. As will become apparent subsequently, the tester 10 operates in a plurality of different modes. In one mode, the transmitted energy will be radiated by one side such as from the right probe 24, will travel clear through the workpiece and be received on the other side, such as by the left probe 26. In another mode, energy pulses will be radiated from one probe 24 into the workpiece and the echoes reflected back will be received by the same probe 24. In a third mode, the other probe 26 will transmit the energy pulses and receive the echoes.

If it is desired to have the tester 10 continuously operate in a single mode, one of the control buttons 58, 1, 2 or 3 on the front panel 20, may be manually depressed. If the Auto or automatic button 60 is depressed, the tester 10 will automatically switch between the various modes in a predetermined sequence. During each mode, the active transducer will transmit a predetermined number of pulses before the tester 10 changes to the next mode in the sequence.

The output of each of the pulser-receivers 36 and 38 is interconnected with a limiter 62 and 64 in the same channel. This limiter may be of conventional design and effective to limit the amplitude of the signal passing therethrough. As a consequence, the large amount of energy present during the transmission of the initial pulse will not overload and/or block the tester 10. However, the relatively weak signal received by the transducer will pass through the limiter without a material amount of attenuation.

The limiter 62 for the right channel 32 is coupled directly to a right gate 66 while the limiter for the left channel 34 is coupled directly to a left gate 68. Both of these gates 66 and 68 may be substantially identical and of conventional design. Each gate 66 and 68 includes a signal input 70-72, a control input 74-76 and a signal output 78-80. When a control signal such as a positive voltage is applied to the control input 74 or 76, the gate 66 or 68 will open and allow video signals from the limiter 62 or 64 to pass from the input 70 or 72 through the gate 66 or 68 to the signal output 78 or 80. However, when a negative voltage is present on the control input, the gate will close and block the passage of any signals.

The two control inputs 74 and 76 for the two gates 66 and 68 are coupled to two separate outputs 114 and 115 from a ring counter or shift register 116. The register 116 which may be of a conventional design is coupled to and actuated by a gate control or count down device 86. The count down 86 may be of a conventional design and is effective to count the clock pulses down by a predetermined factor somewhere in the region of about five to ten. In the present instance, the count down 86 is described as counting down by five.

Each time the selected number of clock pulses occur (i.e. five in the present instance) the count down 86 will reverse its state and begin a new count. As a result the signals on the output 88 will be in the form of a series of square waves that define the frame, i.e. the intervals when the tester 10 is operating in its different modes. The square waves have a time duration which is equal to the time interval for five clock pulses to occur. Since the present tester 10 operates in only three separate modes, at the completion of the third frame, i.e. the beginning of the fourth frame, the counter 86 clears itself and returns to the initial condition that existed during the first frame. As can be seen in lines H and I of FIG. 3, the signals on the inputs 74 and 76 are 180 degrees out-of-phase with each other. As a consequence, the gates 66 and 64 will open and close in synchronous opposition to each other.

The outputs 78 and 80 of the two gates 66 and 68 are coupled to the input of a video amplifier 89 by means of a receiver 90. The receiver 90 is effective to combine the gated RF signals from the right and left channels 32 and 34 and detect these signals so as to form a video or single signal. The video amplifier 89 is then effective to amplify the magnitude of the combined video signal to a more useful level.

The output of the video amplifier 89 is coupled to a signal converter 92. This converter 92 performs several functions but since each function is of a simple and conventional nature, the converter 92 is shown as a single block order to simplify the explanation. The converter 92 has three separate outputs 94, 96 and 98, and is effective to maintain each output 94, 96 and 98 at a separate DC level that differs from the level on the other outputs.

The converter 92 is also effective to split the video signal into three separate but substantially identical video signals. Each of the split video signals is coupled to the outputs 94, 96 and 98 and is added to the DC signal on the respective output.

It will thus be seen that there will be substantially identical video signals on each of the outputs 94, 96 and 98 except that the DC average for each signal is slightly different from the other two signals.

For reasons that will become apparent subsequently, it has been found desirable for the converter 92 to also invert the polarity of one or more of the split video signals before they are added to their respective DC signals. By way of example, the video signals coupled to the first and third outputs 94 and 98 may be inverted.

The signal on the first output 94 will be of a compound nature having a first DC level and an inverted video component. The signal on the second output 96 will also be of a compound nature having a DC level that differs from the first level and a video component that is not inverted. The third output 98 provides a third compound signal having a third or DC level that differs from both of the preceding levels and an inverted video component.

Each of the outputs 94, 96 and 98 from the signal converter are coupled to the signal input of a conventional gate 100, 102 and 104. Each of these output gates 100, 102 and 104 include a control input and a single output 106. When a signal of positive polarity is applied to the control input the gate will open and pass signals to the output 106. However, if the control input is maintained negative the gate will close and block the passage of any signals. The output 106 of the gates 100, 102 and 104 is coupled to the vertical deflection means in the cathode ray tube 22 by means of an amplifier 108.

Each of the control inputs to the gates 100, 102 and 104 are interconnected with the outputs 110, 112 and 114 from a ring counter of shift register 116. The control input 118 to the register 116 is coupled to the output 88 of the gate control or countdown 86 so as to receive the signal shown in line C of FIG. 3.

Figure 3:
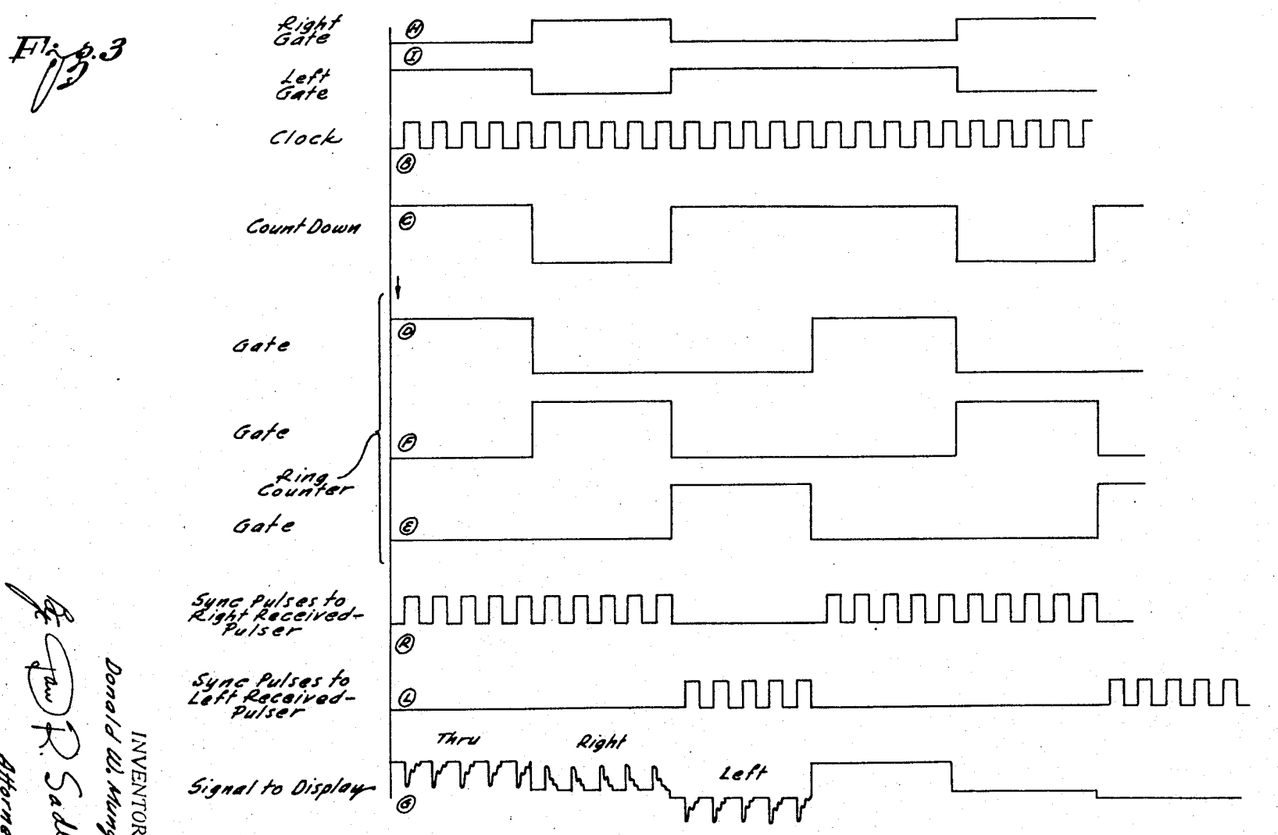
FIG. 3 is a series of waveforms produced at various points in the block diagram of FIG. 2.

The ring counter 116 is controlled by the square wave signal of line C and, accordingly, is synchronized with the countdown 86 and the other portions of the tester 10.

The ring counter 116 is responsive to the square wave in line C and produces separate signals on the outputs 110, 112 and 114. The signals are all substantially identical to each other and include a positive going pulse. Each positive pulse is one frame long and is shifted from the other positive going pulses. This may be accomplished by any well known means.

In addition to having a positive going square pulse, each signal has a negative going portion with a duration twice as long as the positive pulse. Each negative portion occurs synchronously with the positive pulses in the other signals. It can thus be seen that the square waves on the outputs 110, 112 and 114 are successively delayed from each whereby the positive going pulses occur in a preselected sequence. The positive pulses as seen in lines D, E and F of FIG. 3 appear staggered relative to each other, and are thus time displaced from each other and never overlap.

When the square wave D is positive, the second and third output gates 102 and 104 will be closed, but the first gate 100 will open. The signal on the first output 94 will then pass through the gate 100 to the output 106. This signal will have the first DC level and an inverted video signal thereon. This signal corresponds to the first frame in line G of FIG. 3. Following this, when the square wave F goes positive the second gate 102 will open and pass the signal on the output 96 to the output 106. This signal will have the second DC level with the video signal riding thereon. This signal corresponds to the second frame in line G. Following this, when the square wave E goes positive, the third gate 104 will open and the signal from the output 98 will be coupled to the output 106. This signal has the third DC level with an inverted video signal. This signal corresponds to the third frame in line G. The outputs 106 from the various output gates 100, 102 and 104 are connected directly to the amplifier 108. Thus, the vertical deflection means in the oscilloscope 22 will be energized by the staircase signal of line G. The first three frames of line G include both the DC and video signals whereas the last three frames includes only the DC signals. This is the condition that exists when no echoes are being received.

The two control inputs 50 and 52 to the selector gate 48 are coupled to the shift register 116 so that the selector gate 48 will control the pulser 36 and 38 in the two channels 32 and 34 in synchronism with the three output gates 100, 102 and 104. In the present instance, this is accomplished by connecting the output 112 directly with the left input 52. The other two outputs 110 and 114 are coupled to the right input 50 by means of an OR gate 120.

It may thus be seen that when the first or second output gates 100 and 102 are open, the right pulser 36 will energize the right probe 24 for transmitting pulses into the workpiece, and when the third output gate 104 is open the left pulser 38 will energize the left probe 26. In addition, it may be seen that when the first output gate 100 and the third output gate 104 are open, the gate 68 in the left channel 34 will be open. However, when the center output gate 102 is open the gate 66 in the right channel 32 will be open.

In order to use the present tester 10 for ultrasonically examining a workpiece, and particularly for determining the symmetry of the position of the cranial midline 14, the tester 10 may be turned ON and the two transducers or probes 24 and 26 positioned on the opposite sides of the patient's skull. The two probes 24 and 26 are preferably positioned slightly forward of the patient's ears so as to transmit ultrasonic energy into the skull. Preferably, the two probes 24 and 26 are directed towards each other so that their patterns are substantially coaxial.

Normally, the automatic button 60 is depressed whereby the tester 10 will operate in an automatic mode. At the same time the various controls 18 are set to provide a suitable pattern on the face of the oscilloscope 22.

When operating in the automatic mode, the clock 44 will supply a series of clock pulses to the selector gate 48 and to the gate control or countdown 86. The countdown 86 will count the number of clock pulses and produce a square wave which has a frequency that is decreased from the clock frequency by some predetermined amount. In the present instance the square wave or output 88 (Line C of FIG. 3) reverse its polarity each time five clock pulses occur. However, at the end of the third frame and beginning of the fourth frame, the counter returns to the conditions that existed at the beginning of the first frame.

The countdown 86 is coupled to the input 118 and supplies the square wave (line C, FIG. 3) to the ring counter 116. The ring counter 116 produces a series of square waves similar to lines D, E and F in FIG. 3 on the outputs 110, 112 and 114. These square waves will OPEN and CLOSE the right and left gates 66 and 68 and the various output gates 100, 102 and 104. The ring counter 116 is effective to supply the square wave on output 112 directly to the input 52 of selector gate 48, and the square waves on outputs 110 and 114 indirectly by way of the OR gate 120 to the input 50. The selector gate 48 is effective to actuate the right and left pulsers 36 and 38 in accordance with the square waves from the ring counter 116.

Initially, the right pulser 36 will excite the right probe 24 and cause a series of pulses of ultrasonic energy to be transmitted into the interior of the skull. At least a portion of this energy will travel completely through the skull to the opposite side where it will be received by the left pickup probe 26. The energy received by the left probe 26 will produce corresponding RF electrical signals in the left pulser 38. These RF signals will travel through the limiter 64 to the left gate 68.

The square wave from the shift register 116 will maintain this gate 68 OPEN whereby the RF signals can pass from the left channel 34 into the receiver 90. It is to be noted that during this interval the right gate 66 is maintained CLOSED. As a consequence, even though some of the transmitted energy is reflected back to the right probe 24 any resultant signals produced in the right pulser-receiver 36 will be confined to the right channel 32. Thus, only those RF signals resulting from the energy that has passed completely through the skull will be supplied to the receiver 90.

The through transmission video signals are amplified in the video amplifier 89 and fed to the signal converter 92. The signal converter 92 will combine this video signal with three separate DC signals, and provide these separate signals on the three outputs 94, 96 and 98. As previously stated, the video signals on the first and third outputs 94 and 98 are inverted.

The signal from the ring counter or shift register 116 maintains the second and third gates 102 and 104 CLOSED during the through transmission interval. However, at the same time it will maintain the first or through gate 100 OPEN.

As a consequence, the signals which have been produced in the left probe 26 and transferred through the left gate 68, the video amplifier 89 and signal converter 92 will travel through the output gate 100 to the vertical amplifier 108 and thence to the deflection system in the cathode ray tube 22. As has been described before, and as may be seen in the first frame of line G, FIG. 3, the video signal includes a first DC level. This will be effective to cause the scanning of the oscilloscope 22 produced by the horizontal sweep generator 122 to occur along a first horizontal line. The resultant display 124 may be seen in the top lines in each of the oscillograms of FIG. 4. This display 124 includes a first indicator or PIP 124a at the left side of the display and a second PIP 124b at the right side. The first PIP 124a corresponds to the initial transmission of the ultrasonic energy while the second PIP 124b corresponds to the reception of the energy after it has traveled through the skull. Thus, the distance between these PIPs 124a and 124b corresponds to the width of the skull.

After the desired number of clock pulses have been counted by the countdown 86, the countdown 86 will reverse itself as seen in the second frame of line C. The signals on the outputs of the ring counter 116 will then change and CLOSE the left gate 104 and OPEN the right gate 102. During this interval the right pulser 36 will continue to excite the right probe 24. Although ultrasonic energy will continue to travel completely through the skull the left gate 68 will block any through transmission signals leaving the left channel 34. However, the echo signals received by the right probe 24 will generate signals that will pass through the right gate 66 to the receiver 90, the video amplifier 89 and to the signal converter 92.

The reflected video signal will be combined with the three DC levels and appear on the three outputs 94, 96 and 98. The ring counter 116 will now maintain the first and third gates 100 and 104 CLOSED and the second or right output gate 102 OPEN. During this right reflection interval, the video signal having the second DC level will be coupled to the vertical deflection means in the cathode ray tube 22. Since this signal has a second DC level, the horizontal scan produced by the generator 122 will occur on a second line. Accordingly, the resultant display 126 will be vertically displaced from the first display 124. The display 126 is shown in the second line of each oscillogram of FIG. 4 and includes two PIPs 126a and 126b.

The first PIP 126a corresponds to the instant that the ultrasonic energy is initially transmitted and the second PIP 126b corresponds to the instant the echo is received. The distance between these two PIPs 126a and 126b will thus correspond to double the distance from the side wall of the skull to the source of the echoes.

After the required number of clock pulses have reached the countdown 86, the ring counter 116 will produce a series of signals on its outputs 110, 112 and 114 which will cause the left pulser-receiver 38 to be energized and the right pulser-receiver 36 to be inactive.

During this mode the right gate 66 will be CLOSED and the left gate 68 will be OPEN. As a result ultrasonic energy reflected from within the skull will produce video signals that will be carried through the left channel 34 to the receiver 90 and video amplifier 89. The video signal will then be combined with the three DC levels and present on the three outputs 94, 96 and 98. During this mode, the shift register 116 will CLOSE the first and second gates 100 and 102, and OPEN the third or left gate 104. The video signal having the third DC level will then travel through the amplifier 108 to the vertical deflection system in the cathode ray tube.

Since this signal has a third DC level the resultant display 128 will be vertically displaced from the first and second displays 124 and 126. This display 126 also includes a PIP 128a corresponding to the initial transmission of energy into the left side of the skull, and a second PIP 128b corresponding to reception of the echo. The spacing between the two PIPs 128a and 128b will thus represent the position of the source of the echoes.

After the foregoing sequence is completed the tester 10 will continue to repeat the sequence for as long as the ultrasonic tester is turned ON and the AUTO button is depressed.

It can be seen from the foregoing description that the first or through transmission will produce the upper display 124, the right transmission and reflection will produce the second display 126 and the left transmission and reflection will produce the third display 128. The sweep generator 122 is triggered by the clock 44 so that the scannings for all three displays 124, 126 and 128 are synchronized with each other. As a result the first PIP 124a, 126a and 128a in each display is aligned with all of the other first PIPs.

The thickness of the skull will determine the interval of time required for the energy to travel completely through the skull from one probe to the other. This, in turn, will be effective to determine the distance between the PIPs 124a and 124b. The other displays are produced by echoes and, therefore, the space between the PIPs 126a–126b and 128a–128b will be determined by double the distance between the side of the skull and the source of the echo. It should be borne in mine that if the ultrasonic energy travels from one side to the exact center and back again to the first side, it will have traveled the same distance as if it has traveled completely through the skull. Thus, if the source of reflections is disposed exactly in the center of the skull the second PIPs 126b and 128b in the second and third displays will be substantially aligned with the second PIPs 124b in the upper display.

When the present tester 10 is operating automatically to determine the symmetry of the midline 14, the two probes 24 and 26 are positioned so that they are aligned with each other for through transmission and positioned so that echoes will be received from the midline 14. Normally, the midline 14 is positioned in the center of the skull and equally spaced from the two probes 24 and 26. Accordingly, the second PIPs 124b, 126b and 128b will be aligned with each other as seen in the tope oscillogram of FIG. 4.

It should be noted that the PIPs are shown in a somewhat idealized and simplified form and also as being "perfectly" aligned.

It can be appreciated that the human head is a complex structure and that there are numerous interfaces which can, and do, reflect ultrasonic energy. Accordingly, the display may include additional PIPs. Also, the tissue structure which forms the midline is, in and of itself, very complex and normally includes a plurality of interfaces of reflective surfaces. This is combination with the characteristics of the tester usually results in the PIPs 126b and 128b being rather broad or wide. Also, these PIPs frequently have a peculiar or distinctive shape resembling an M similar to that shown in the drawings. Recognition of the characteristic of the PIPs produced by a particular tester can be of considerable value to the operator in identifying the source of the echoes. However, it should be understood that the present invention provides additional and more reliable means for identifying the midline and also that there may be considerable variations in the appearance of the displays and of the PIPs.

It should also be noted that it is possible for the midline 14 to be slightly shifted from a true center position and still be normal. Also, there may be some variation due to variations in the position of the probes 24 and 26. Accordingly, it has been found desirable to provide markers in a fourth display 130 so as to define the acceptable tolerances. These markers may be provided by adding a fourth output on the converter 92 and gating a signal having a fourth level of DC and a square wave thereon into the amplifier 108.

In the event the midline 14 has been shifted away from the true center position and towards one side of the skull, the amount of time required for the ultrasonic energy to travel from one side to the midline 14 and back will differ considerably from the time required for the energy to travel from the opposite side to the midline 14 and back to the opposite side. As a result, the second PIPs 126b and 128b in the second and third displays will be laterally displaced from each other. It should be noted that this shift will be of equal and opposite amounts, since any decrease on one side will produce an identical increase on the opposite side.

Accordingly, the second PIPs 126b' and 128b' in the second and third displays will be symmetrically disposed on the opposite sides of the second PIP 124b in the first display. It will be possible for the operator to easily observe this pattern and very quickly determine whether or not the midline 14 has been shifted. Also, the amount of the shift can be determined by comparing the displacement of the PIPs 127b' and 128b' with the markers 130 provided immediately below the displays.

It may be appreciated that there are a large number of interfaces within the brain that are capable of reflecting ultrasonic energy. As a consequence, it is possible that the ultrasonic energy being received by one of the probes if reflected from a target which is closely spaced to the midline. By way of example, the energy may be reflected from a ventricle disposed immediately adjacent to the midline. This, of course, will cause the corresponding display to be shortened similar to the second display in the third oscillogram in FIG. 4.

It will be noted that under these circumstances the second PIPs 126b'' and 128b'' are not positioned symmetrically with respect to the second PIP 124b in the through transmission display. This condition will also be obvious to an operator. As a consequence, he will recognize that the midline 14 has not necessarily shifted but, instead that a false target may be the source of the echoes. Accordingly, the operator can adjust the position of the pickup probes 24 and 26 whereby the ultrasonic energy misses the false target, and is properly focused on the midline 14.

It will, of course, be readily apparent that it is not necessary to employ three separate displays. For example, just the through transmission and one reflection may be employed to indicate a lateral shift of the midline. Also, it is possible to merely use two reflective signals and to observe whether or not these displays are aligned. However, as described above and as illustrated in FIG. 4, it is possible to obtain misleading results, particularly during the stresses of an emergency. However, by employing all three of the traces and requiring a complete alignment of all three PIPs, an unambiguous and highly reliable signal can be obtained indicating whether or not the midline has, in fact, been shifted.

If desired, the 1, 2 and 3 buttons 58 may be depressed to make additional measurements and investigations if so desired. These will be effective to "lock" the tester 10 in the through mode, the right reflecting mode or the left reflecting mode. The probes 24 and 26 can then be manipulated to search the various portions of the head for the presence of any abnormalities such as a tumor, subdural hematoma, etc. Also, the various dimensions of the skull and/or the abnormalities may be measured.

If at any time it is desired to make a permanent record of the results, the operator may step on the foot pedal 140. This will be effective to trigger the shutter in a camera focused on the face of the cathode ray tube. The resultant photograph will provide a permanent record for future reference or may be more carefully and leisurely studied by the operator following the conclusion of the test. The operator may very quickly observe from the photograph the relative positions of the different portions of the display, and particularly the PIPs 124b, 126b, and 128b. Normally, the PIPs 126b and 128b will be aligned with the PIP 124b. It is to be noted that the PIPs 126b and 128b are considerably broader than the PIP 124b. Accordingly, the term "aligned" as used herein is intended to be included to be symmetrically disposed, i.e., the center line of the M is aligned with the center line of the PIP 124b. However, in this regard it is to be noted that the operator of the tester and its various functions are all automatically controlled. Thus, both of the operators hands are free to perform any desired function such as manually manipulating the probes 24 and 26 to make sure they are properly oriented with respect to each other and to the desired target. In addition, since the camera is actuated by a convenient foot pedal 140 it is possible for the operator to take a picture even though his hands are being used to manipulate the probes 24 and 26.

Figure 5:
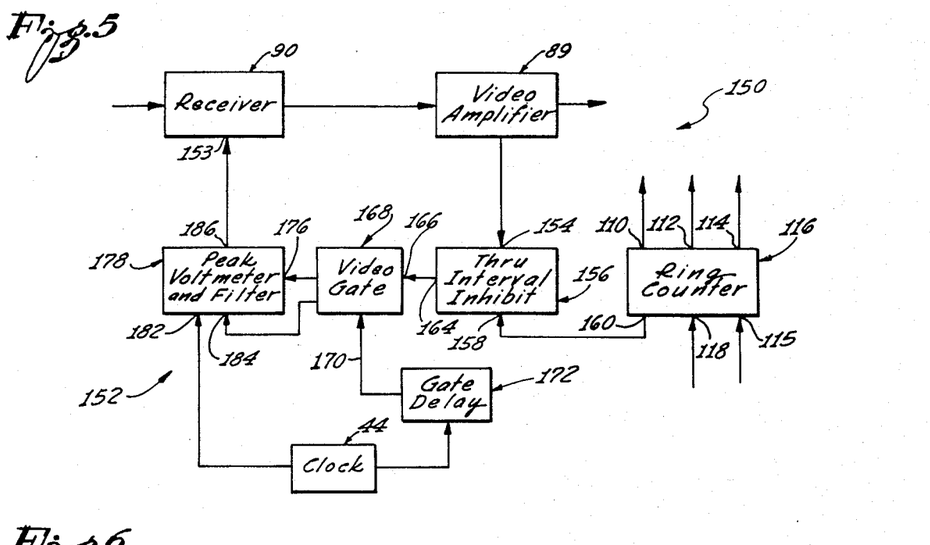
FIG. 5 is a block diagram of a modification of the tester of FIG. 1.

Under some circumstances it may be desirable to employ the embodiment 150 of FIG. 5. This embodiment 150 is particularly useful when the output means includes a meter or similar device in addition to or as an alternative to the oscilloscope 22. It is also desirable when the tester 150 is to be used under a wide variety of operating conditions where the nature of the signals vary as it reduces the amount of adjustment the operator must make and standardize the results.

This embodiment includes substantially all elements in the preceding embodiment. However, in addition it includes an automatic gain control 152. The gain control 152 is coupled to a control input 153 for the receiver 90 to vary its gain and stablize the amplitudes of the video signal.

The automatic gain control 152 portion of this embodiment is shown in FIG. 5. The receiver 90, the video amplifier 89, the ring counter 116 and the clock 44 are substantially the same as in the first embodiment and are coupled into the rest of the system substantially as shown in FIG. 2.

The signal input 154 of a control or inhibit gate 156 is coupled to an output of the video amplifier 89. The gate 156 will thus receive all of the video signals amplified in the receiver 90.

Figure 6:
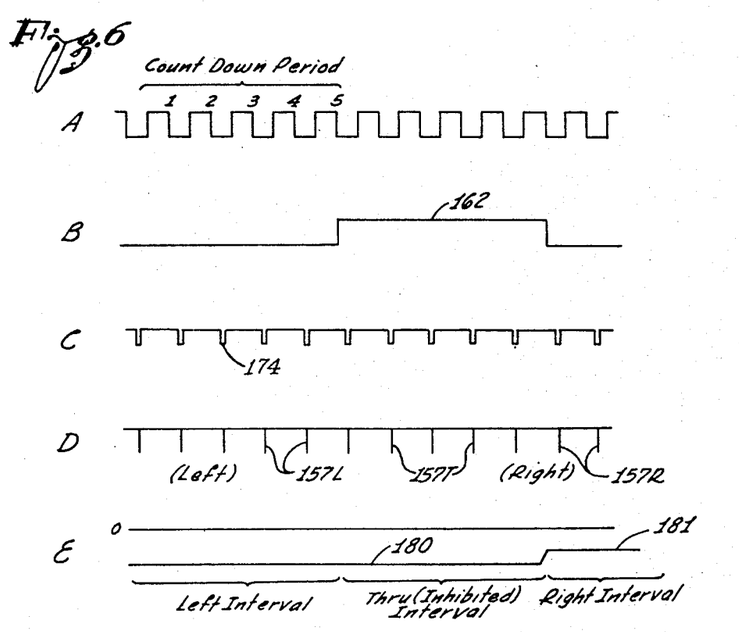
FIG. 6 is a series of waveforms present in the modification of FIG. 5.

The control input 158 to the gate 156 is coupled to an output 160 from the ring counter 116. This output 160 is effective to supply a squarewave 162 (FIG. 6B) to the control input 158 in synchronism with the control signals supplied to the gates 100, 102 and 104. This squarewave 162 is effective to maintain the gate 156 closed when the tester 150 is operating in a through transmission mode. As a consequence the video signals 157T for the through transmissions are completely blocked by the gate 156.

The squarewave 162 is effective to open the gate 156 when the tester 150 is operating in either the right of left echo mode. As a consequence a video signal 157L or 157R will be present on the output 164 of the gate 156 corresponding to the echo from the right or left side of the midline.

The output 164 of the inhibit gate 156 is coupled to the signal input 166 of a video gate 168. The video gate 168 is normally maintained closed so that no signal may pass therethrough. The control input 170 is coupled to the suitable control whereby the gate 168 will operate in synchronism with the rest of the tester 150. In the present instance this is accomplished by coupling the input 170 to the clock 44 by means of a delay gate 172. The gate 172 is a delay circuit responsive to the clock pulses and is effective to produce a series of squarewaves 174. Each squarewave 174 starts a predetermined time after the beginning of the corresponding clock pulse. The time delay is slightly less than the time required to receive an echo from the midline.

Also, each of the squarewaves 174 have a time duration that is on the same order as that required for the echo signal to occur. Thus each time an echo video signal 157 or 154 occurs a squarewave 174 will be applied to the input 170 whereby the gate 168 will open and pass the signal. At all other times the gate 168 is maintained closed whereby no signals are passed.

The signal 176 for a peak volt meter and filter 178 is coupled to the signal output from the video gate 168. This volt meter 178 is responsive to a maximum or peak voltage and is effective to produce a DC signal 180 that corresponds thereto.

A clock input 182 is coupled to the clock 44 so as to receive the clock pulses therefrom, while a reset input 184 is coupled to the video gate 168. At some particular point in each frame, for example at the end of the through transmission mode, the volt meter 178 will be reset as a result of a signal being applied to input 184. Following this a new DC signal 180' will be produced that has an amplitude corresponding to the peak amplitude of the video signal occurring during the preceding frame.

The output 186 from the voltage meter 178 is coupled to a control input 153 in the receiver 90. This input 153 is effective to regulate the gain of the receiver 90 in response to the amplitude of the signal present on the input.

This embodiment 150 is utilized in substantially the same manner as the preceding embodiment. During each frame the tester 150 operates in three different modes, i.e. a right echo, a left echo and a through transmission. The through transmission video signal is blocked by the inhibit gate 156. However the video signals corresponding to either the right or left midline echoes or both are coupled through the gates 156 and 168 to the volt meter 178. The volt meter will then produce a DC signal 180 corresponding to the maximum amplitude of the largest video signal. This DC signal 180 is applied to the input 153 of the receiver 90 whereby its gain is adjusted to maintain the amplitude of the sampled midline video signal 157 substantially constant.

As can be seen in FIG. 6E the DC level remains substantially constant throughout a frame. However, when the next frame begins, i.e. the right echo interval, the DC signal 180' may change so as to readjust the gain of receiver 90 and restore the video signals to a predetermined level. It will thus be seen that the amplitude of the displays on the oscilloscope 22 will be maintained substantially constant and easier to compare. In the event the output means includes a meter or some other form of utilizing device, the signals supplied to the output means will be more nearly uniform during all operating conditions and as a consequence will be more accurately utilized.

While only a limited number of embodiments of the present invention are disclosed herein, it will be readily apparent to persons skilled in the art that numerous changes and modifications may be made thereto without departing from the scope of the invention. Accordingly, the foregoing disclosure and description thereof are for illustrative purposes only and do not in any way limit the invention which is defined only by the claims which follow.

I claim:

1. An encephalograph of the class described including the combination of
    - a pair of ultrasonic transducers adapted to be acoustically coupled to the opposite sides of a head containing a brain subdivided by a midline and surrounded by a head,
    - transmitter means and receiver means coupled to said transducers and effective to energize said transducers whereby pulses of ultrasonic energy are transmitted into a head and pulses of ultrasonic energy are received from said head, said receiver means effective to produce electrical signals corresponding to said received ultrasonic energy,
    - a clock coupled to said transmitter and receiver means for synchronizing the transmitting and receiving times of the ultrasonic energy,
    - timing means coupled to the clock and effective to generate timing pulses which define frame intervals,
    - a control coupled to said timing means and to said transmitter means and receiver means,
    - said control being effective to energize said transducers in a first mode during a first frame interval whereby pulses of ultrasonic energy are transmitted into the head from the first side thereof and echoes of the energy reflected from the midline are received, said receiver means being effective during said first frame to produce a first signal which corresponds to the position of the midline relative to the first side,
    - said control being effective to energize said transducers in a second mode during a second frame interval whereby pulses of ultrasonic energy are transmitted into the head from the second side and echoes of the energy reflected from the midline are received, said receiver means being effective during said second frame to produce a second signal which corresponds to the position of the midline relative to the second side,
    - said control being effective to energize the transducers in a third mode during a third frame interval whereby pulses of ultrasonic energy are transmitted into the head from one side and received at the opposite side, said receiver means being effective during said third frame to produce a third signal which corresponds to the space between said sides,
    - an output coupled to said receiver means for comparing said first, second and third signals and indicating the positions of the midline relative to the centerline and between the opposite sides of the head,
    - an automatic gain control means coupled to said receiver means and responsive to at least one of said signals and effective to vary the gain of said receiver means to maintain the amplitude of said signals substantially constant,
    - said automatic gain control means including a gate coupled to receive signals from said receiver means and to be responsive to said timing means for inhibiting signals from said receiver means upon receipt of third signals from said control and passing first and second signals from said control,
    - normally closed video signal gating means coupled to said gate in said gain control means including a control input coupled to said clock for operating said video gating means in synchronism therewith,
    - delay means coupled between said clock and said video signal gating means for delaying said signal from said clock by a time less than that required to receive said midline signals, and
    - peak detector means coupled to said video signal gating means and coupled to said receiver means, said peak detector means being effective to vary the gain of said receiver means in response to the amplitude of said peak detector means, said peak detector means being coupled to said clock to reset said peak detector means at the end of each through transmission signal.

* * * * *